US012672014B2

(12) United States Patent
Rodrigo et al.

(10) Patent No.: US 12,672,014 B2
(45) Date of Patent: Jun. 30, 2026

(54) SERVICE PRODUCER HEALTH-CHECK

(71) Applicant: Telefonaktiebolaget LM Ericsson (publ), Stockholm (SE)

(72) Inventors: Maria Cruz Bartolomé Rodrigo, Torremocha de Jarama Madrid (ES); Magnus Hallenstål, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 407 days.

(21) Appl. No.: 17/926,599

(22) PCT Filed: Aug. 14, 2020

(86) PCT No.: PCT/EP2020/072860
§ 371 (c)(1),
(2) Date: Nov. 20, 2022

(87) PCT Pub. No.: WO2021/233563
PCT Pub. Date: Nov. 25, 2021

(65) Prior Publication Data
US 2023/0199534 A1 Jun. 22, 2023

(30) Foreign Application Priority Data
May 21, 2020 (EP) .................................... 20382431

(51) Int. Cl.
*H04W 24/08* (2009.01)
*H04L 43/0811* (2022.01)
*H04L 43/0817* (2022.01)
(52) U.S. Cl.
CPC ......... *H04W 24/08* (2013.01); *H04L 43/0811* (2013.01); *H04L 43/0817* (2013.01)

(58) Field of Classification Search
CPC . H04L 43/10; H04L 43/0811; H04L 43/0817; H04W 24/08; H04W 4/70
See application file for complete search history.

(56) References Cited

U.S. PATENT DOCUMENTS

2019/0081886 A1* 3/2019 Meyer ................. H04L 65/1036
2019/0165994 A1* 5/2019 Togo ................... H04L 43/0811
(Continued)

FOREIGN PATENT DOCUMENTS

WO WO 2019/1628652 A1 8/2019

OTHER PUBLICATIONS

International Search Report and Written Opinion of the International Searching Authority, PCT/EP2020/072860, mailed Feb. 11, 2022, 12 pages.
(Continued)

*Primary Examiner* — Andrew Lee
(74) *Attorney, Agent, or Firm* — Sage Patent Group

(57) ABSTRACT

A method for a service consumer entity to check the health status of a service producer entity, including determining the execution or connectivity health status of the service producer entity and transmitting to a service discovery entity the health status of the service producer entity. The health status can be determined using a health-check service exposed by the service producer entity or performing network-level reachability test mechanisms. The method further includes receiving at the service consumer entity from a service discovery entity a request to check the health status of the service producer entity, for example using a service exposed by the service consumer entity to provide the health status of a service producer entity.

20 Claims, 10 Drawing Sheets

(56)  References Cited

U.S. PATENT DOCUMENTS

| | | | | |
|---|---|---|---|---|
| 2020/0092710 A1* | 3/2020 | Kim | ..................... | H04W 60/00 |
| 2020/0100319 A1* | 3/2020 | Talebi Fard | .......... | H04W 76/32 |
| 2020/0120570 A1* | 4/2020 | Youn | ..................... | H04W 8/08 |
| 2020/0145910 A1* | 5/2020 | Jangid | .................. | H04W 60/00 |
| 2020/0366577 A1* | 11/2020 | Sapra | ................. | H04W 64/003 |
| 2020/0396571 A1* | 12/2020 | Kim | ........................ | H04W 4/14 |
| 2020/0396623 A1* | 12/2020 | Kakinada | ............ | H04L 41/0654 |
| 2021/0020101 A1* | 1/2021 | Van Eessen | ........... | G09G 3/006 |
| 2021/0092608 A1* | 3/2021 | Li | ....................... | H04W 12/106 |
| 2021/0112001 A1* | 4/2021 | Li | ......................... | H04W 76/12 |
| 2021/0274575 A1* | 9/2021 | Talebi Fard | .......... | H04W 76/12 |
| 2021/0306231 A1* | 9/2021 | Lee | .................... | H04L 41/5067 |
| 2022/0104308 A1* | 3/2022 | Talebi Fard | .......... | H04W 76/32 |
| 2022/0150763 A1* | 5/2022 | Godin | ............. | H04W 36/00226 |
| 2022/0394595 A1* | 12/2022 | Zhu | ....................... | H04W 12/08 |
| 2023/0354447 A1* | 11/2023 | Talebi | .................. | H04W 76/12 |

OTHER PUBLICATIONS

3rd Generation Partnership Project; Technical Specification Group Services and System Aspects; Management and Orchestration; Management Capabilities (Release 16) 3GPP TS 28.537 V16.0.0 (Mar. 2020) (XP051861138) 13 pages.

3rd Generation Partnership Project; Technical Specification Group Core Network and Terminals; 5G System—Phase 1; CT WG4 Aspects (Release 15) 3GPP TR 29.891 V2.0.0 (Dec. 2017) (XP051624270) 146 pages.

3rd Generation Partnership Project; Technical Specification Group Core Network and Terminals; 5G System; Restoration Procedures (Release 16) 3GPP TS 23.527 V16.2.0 (Dec. 2019) 19 pages.

3rd Generation Partnership Project; Technical Specification Group Core Network and Terminals; 5G System; Network Function Repository Services; Stage 3 (Release 16) 3GPP TS 29.510 V16.3.0 (Mar. 2020) 182 pages.

* cited by examiner

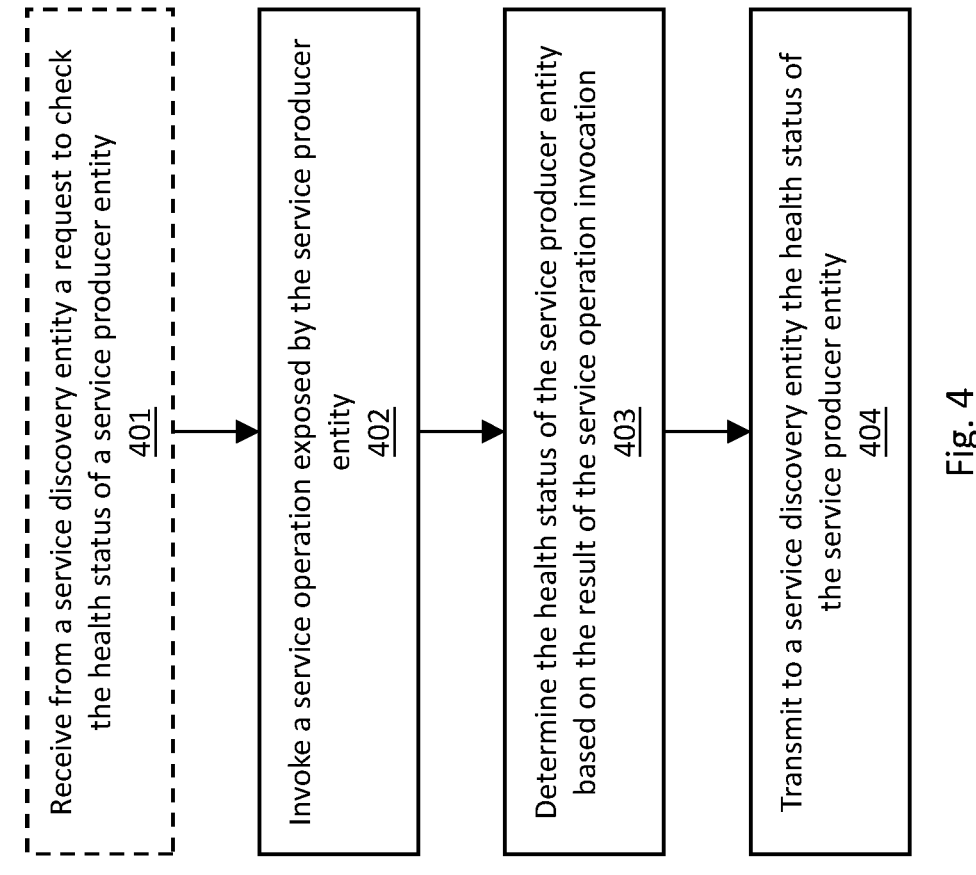

Receive from a service discovery entity a request to check the health status of a service producer entity
401

Invoke a service operation exposed by the service producer entity
402

Determine the health status of the service producer entity based on the result of the service operation invocation
403

Transmit to a service discovery entity the health status of the service producer entity
404

Fig. 4

Receive an invocation from a service consumer entity or a service discovery entity, to a service operation exposed by the service producer entity
501

Transmit to the service consumer entity or the service discovery entity the result of the service operation invocation
502

Transmit to a service consumer entity a request to check the health status of a service producer entity
601

Receive from the service consumer entity the health status of the service producer entity
602

Transmit a request to a service operation exposed by a service producer entity
701

Determine the health status of the service producer entity based on the result of the service operation invocation
702

SERVICE PRODUCER HEALTH-CHECK

CROSS REFERENCE TO RELATED APPLICATIONS

This application is a 35 U.S.C. § 371 national stage application of PCT International Application No. PCT/EP2020/072860 filed on Aug. 14, 2020, which in turn claims foreign priority to European Patent Application No. 20382431.3, filed on May 21, 2020, the disclosures and content of which are incorporated by reference herein in their entirety.

TECHNICAL FIELD

The present invention generally relates to health-check mechanisms in mobile networks; and more specifically, the invention relates to the detection of connectivity issues between entities in a mobile network.

BACKGROUND

Current fifth generation telecommunications systems that follow architectures and protocols as per 3GPP Release 15 and following releases, implement the so-called Service Based Architecture (SBA). In an SBA, the entities that form the network architecture expose services that are used by other entities.

The Fifth Generation (5G) Core Network (5GC) is specified following SBA principles for its Control Plane (CP) entities. In 5GC, the network entities forming the architecture are named Network Functions (NF). In turn, the services exposed by the NFs are referred to as NF services. In 5GC, a NF hosting services is referred to as a producer NF, and a NF using the services of a producer NF is referred to as a consumer NF.

The Network Repository Function (NRF) is the NF supporting service discovery capabilities. NRF receives NF Discovery Requests from NF instances and provides the information of the discovered NF instances to the NF instance issuing the discovery request.

NFs allow two kind of service operations: request/response and subscribe/notify operations. In a request/response operation a consumer NF sends a service request to a producer NF, and the producer NF responds with the request result to the consumer NF. In subscribe/notify operations a consumer NF sends a subscription request to a producer NF, which is accepted or rejected by the producer NF. If accepted, in the following the producer NF sends notifications to the consumer NF until the subscription is cancelled.

Each NF and NF service are associated to a status. The status values specified are "REGISTERED", the NF Instance or NF service is registered in NRF and can be discovered by other NFs; "SUSPENDED", the NF Instance or NF service is registered in NRF but it is not operative and cannot be discovered by other NFs; and "UNDISCOVERABLE", the NF instance or NF service is registered in NRF and is operative but cannot be discovered by other NFs.

For the NRF to properly maintain the information of available NF instances and their supported services, each NF shall register to NRF including its profile. In the following, the NFs shall contact the NRF periodically, transmitting to NRF a so-called heartbeat, in order to show that the NF is operative. The time interval at which the heartbeat shall be sent is configurable and deployment-specific, usually provided by the NRF to the NF in the registration response.

When the NRF detects that a given NF has not initiated any contact for a longer period of time than the heartbeat interval, the NRF changes the status of the NF to SUSPENDED which implies that the NF and its services can no longer be discovered by other NFs via the NRF discovery service. Subsequently, the NRF notifies NFs subscribed to receive notifications of changes of the NF profile that the NF status of the corresponding NF instance has changed to SUSPENDED.

If the NRF modifies the heartbeat interval value of a given NF instance, it shall return the new value to the registered NF in the response of the next periodic heartbeat interaction received from that NF and, until then, the NRF shall apply the heartbeat check procedure according to the original interval value.

A problematic aspect is that the heartbeat interval value is deployment-specific, and usually set to tens of seconds or even minutes. Therefore, since the NRF passively waits for the heartbeat, the NRF needs to take this time to find that an NF or NF service is unavailable. A problematic aspect of the heartbeat solution is this error window, where the NF or NF service status in the NRF is wrong (i.e. set to REGISTERED) and the consumers are not informed. Additionally, the NF or NF service that may be down can still be discovered and selected by other consumer NFs.

In the 5G network, the latency for the signaling is a critical Key Performance Indicator (KPI). Control plane usual requirement is that a request/response is to be performed within tens of milliseconds, therefore an error window of tens of seconds or minutes is a significant amount of time.

Another problematic aspect is that the NRF may set an NF to SUSPENDED not because the NF or NF service is unavailable but in case of connectivity problems between the NRF and the NF or NF service. Therefore, this status value does not provide a valuable information for the consumer NFs, as long as the NF or NF service may still be perfectly up and running and able to process requests.

A mechanism for a consumer NF to verify whether a producer NF or NF service is operative is to use network-level reachability mechanisms, e.g. the Internet Control Message Protocol (ICMP) offers the well-known PING utility for this purpose. The consumer NF may check whether a producer NF or NF service is up and running by using the PING, but this does not ensure that the NF/NF service is in fact working. E.g. A NF may have a frontend entity distributing traffic to different service instances, and that frontend entity may be working but a service behind the frontend may be down. In this case the frontend entity would respond positively to the PING request.

A further problematic aspect is that since a SUSPENDED state is not indicative of the NF or NF service malfunctioning, a NF consumer may decide to continue sending traffic to the SUSPENDED NF or NF service, but if the NF or NF service is in fact down, the traffic will be lost and the signaling delay will increase dramatically until the situation is corrected by other mechanisms, e.g. redundancy.

A further problematic aspect is that the NRF may consider an NF or NF service as perfectly operative due to the correct functioning of the heartbeat mechanism, but the NF or NF service may be experiencing connectivity issues with other NFs. In this case, there are not existing mechanisms to inform NFs and NF services about the connectivity issues towards a certain NF or NF service.

SUMMARY

An object of the invention is to enable checking the health of a service producer entity and detecting connectivity issues between said service producer entity and other mobile network entities in a fast and reliable manner.

A first aspect of the invention relates to a method for a service consumer entity to check the health status of a service producer entity. The method includes determining the health status of the service producer entity and transmitting to a service discovery entity the health status of the service producer entity. In an embodiment of the method, the determining step comprises transmitting a request message to the service producer entity, particularly transmitting a subscription request message to the service producer entity. In an embodiment of the method, the request message is a request toward a health-check service exposed by the service producer entity. In an embodiment of the method, the determining step comprises performing network-level reachability test mechanisms to the service producer entity. In an embodiment of the method, determining the health status comprises determining an unhealthy status of the service producer entity in response to the reception of an error indication, or the reception of no response, from the service producer entity. In an embodiment of the method, determining the health status comprises determining a healthy status of the service producer entity in response to the reception of a correct response from the service producer entity. In an embodiment of the method, the health status is one of an execution status or a connectivity status. The method further includes receiving from a service discovery entity a request to check the health status of the service producer entity. In an embodiment of the method, the receiving step comprises receiving from the service discovery entity a request to a service exposed by the service consumer entity to provide the health status of a service producer entity.

A second aspect of the invention relates to a method for a service producer entity to check its health status. The method includes receiving from a mobile network entity a health-check request to a health-check service exposed by the service producer entity and transmitting to the mobile network entity the result of the health-check request. In an embodiment of the method, the transmitting step comprises transmitting an error indication, or transmitting no response. In an embodiment of the method, transmitting comprises transmitting an indication of a healthy status.

A third aspect of the invention relates to a method for a service discovery entity to check the health status of a service producer entity. The method includes transmitting to a service consumer entity a request to check the health status of the service producer entity and receiving from the service consumer entity the health status of the service producer entity. In an embodiment of the method, the transmitting step comprises transmitting a request to a service exposed by the service consumer entity to provide the health status of a service producer entity. In an embodiment of the method, the health status can be one of an execution status or a connectivity status.

A fourth aspect of the invention relates to a method performed by a service discovery entity to check the health status of a service producer entity. The method includes transmitting a request to a service exposed by the service producer entity and determining the health status of the service producer entity based on the result of the service request. In an embodiment of the method, the service is a health-check service exposed by the service producer entity. In an embodiment of the method, the transmitting step comprises performing network-level reachability test mechanisms toward the service producer entity. In an embodiment of the method, the determining step comprises determining an unhealthy status of the service producer entity in response to the reception of an error indication, or the reception of no response, from the service producer entity. In an embodiment of the method, determining comprises determining a healthy status of the service producer entity in response to the reception of a correct response from the service producer entity. In an embodiment of the method, the health status can be one of an execution status or a connectivity status.

Other aspects of the invention relate to mobile network nodes, particularly a service producer entity, a service consumer entity and a service discovery entity, each configured to perform the respective methods as described above. Other aspects of the invention relate to computer program and computer program products.

In some embodiments of these aspects, the service discovery entity is a Network Repository Function (NRF), the service consumer entity is a Network Function (NF) or NF service, and the service producer entity is also a NF or NF service.

Advantageously, the solution disclosed herein achieves that when a service producer entity experiences execution or connectivity problems, this is detected by a service consumer entity when trying to communicate with the service producer entity and immediately notified to a service discovery entity. Subsequently, the service discovery entity can take the appropriate measures to mitigate and solve the detected problem, for example notify the health status of the service producer entity to service consumer entities that are subscribed to this information, so that the service consumer entities can have a timely update of the health status of the service producer entity.

Further advantageously, the solution disclosed herein achieves that a mobile network entity, for example a service consumer entity or a service discovery entity, can proactively check the health of a service producer entity and perform the corresponding actions when health issues are detected.

Further advantageously, the solution disclosed herein achieves the possibility to revert false health issues detections, since it allows to check the health of a service producer entity using several service consumer entities, therefore increasing the health check accuracy.

Further advantageously, the solution disclosed herein allows the definition of more granular states in a service discovery entity. For example, there may be a service producer entity executing correctly but having connectivity issues with other specific entities. The disclosed solution allows to detect this more granular states and trigger appropriate actions accordingly.

Further advantageously, the solution disclosed herein allows that a failure of a service discovery entity does not impact the operation and usage of a service producer entity, since the consumers of that service producer entity can check its healthy status and continue using the service producer entity.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The invention may best be understood by referring to the following description and accompanying drawings that are used to illustrate particular embodiments of the invention. In the drawings:

FIG. 4 is a flowchart illustrating a method performed by a service producer entity for using a secondary notification address for a notification, according to particular embodiments of the solution described herein;

DETAILED DESCRIPTION

The invention will now be described in detail hereinafter with reference to the accompanying drawings, in which examples of embodiments or implementations of the invention are shown. The invention may, however, be embodied or implemented in many different forms and should not be construed as limited to the embodiments set forth herein. Rather, these embodiments are provided so that this disclosure will be thorough and complete, and will fully convey the scope of present invention to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1:
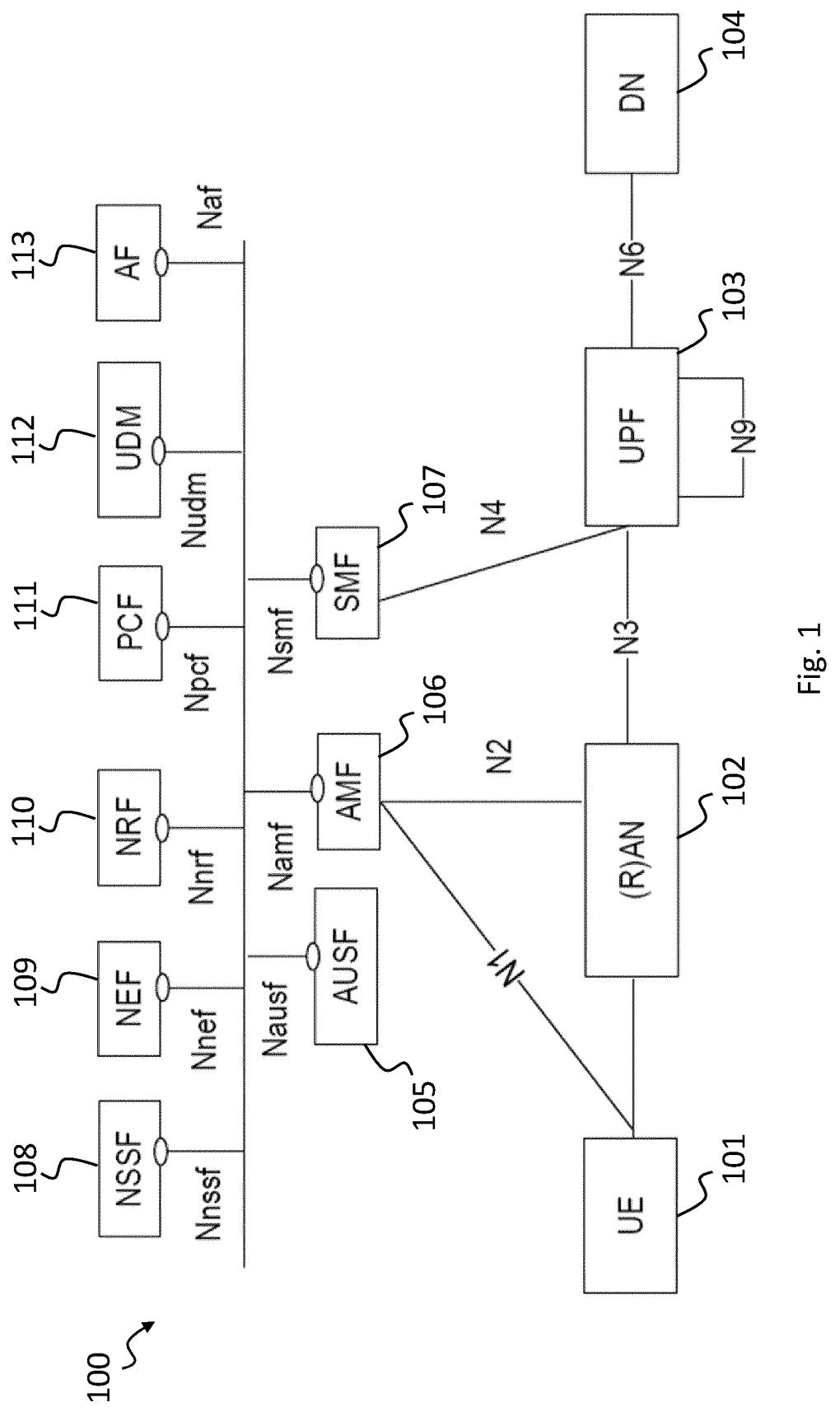
FIG. 1 is a networked system in accordance with particular embodiments of the solution described herein.

It will be appreciated that example embodiments described herein arise in the context of a telecommunications network, including but not limited to a telecommunications network that conforms to and/or otherwise incorporates aspects of a fifth generation (5G) architecture. FIG. 1 is an example networked system 100 in accordance with example embodiments of the present disclosure. FIG. 1 specifically illustrates User Equipment (UE) 101, which may be in communication with a (Radio) Access Network (RAN) 102 and Access and Mobility Management Function (AMF) 106 and User Plane Function (UPF) 103. The AMF 106 may, in turn, be in communication with core network services including Session Management Function (SMF) 107 and Policy Control Function (PCF) 111. The core network services may also be in communication with an Application Server/Application Function (AS/AF) 113. Other networked services also include Network Slice Selection Function (NSSF) 108, Authentication Server Function (AUSF) 105, User Data Management (UDM) 112, Network Exposure Function (NEF) 109, Network Repository Function (NRF) 110 and Data Network (DN) 104. In some example implementations of embodiments of the present disclosure, an AMF 106, SMF 107, UPF 103, PCF 111, AUSF 105, NRF 110, UDM 112, NEF 109, AF 113, and NSSF 108 are each considered to be an NF. It will be appreciated that one or more additional network functions (NF) may be incorporated into the networked system.

The solution described herein aims to enable checking the health of a service producer entity and detecting connectivity issues between said service producer entity and other mobile network entities in a fast and reliable manner.

To achieve such object, this disclosure provides a method performed by a service consumer entity (201), a service producer entity (202), and a service discovery entity (203). In some embodiments, the service discovery entity 203 is an NRF 110. In some embodiments, the service consumer entity 201 is a consumer NF. In some embodiments, the service producer entity 202 is a producer NF. In some embodiments, the service consumer entity 201 is a consumer NF service. In some embodiments, the service producer entity 202 is a producer NF service. Examples of consumer NFs and/or producer NFs include, but are not limited to, any of the control plane nodes represented in FIG. 1, namely AUSF 105, AMF 106, SMF 107, NSSF 108, NEF 109, PCF 111, UDM 112 and AF 113.

The method comprises determining (403) at the service consumer entity (201) the health status of the service producer entity (202); and transmitting (214, 313, 404) from the service consumer entity (201) to the service discovery entity (203) the health status of the service producer entity (202). In some embodiments of the method, the determining step comprises transmitting a request message from the service consumer entity (201) to the service producer entity (202), particularly transmitting a subscription request message from the service consumer entity (201) to the service producer entity (202). In some embodiments of the method, the request message is a request toward a health-check service exposed by the service producer entity (202). In some embodiments of the method, the determining step comprises performing network-level reachability test mechanisms from the service consumer entity (201) to the service producer entity (202). In some embodiments of the method, the determining step comprises determining at the service consumer entity (201) an unhealthy status of the service producer entity (202) in response to the reception of an error indication, or the reception of no response, at the service consumer entity (201) from the service producer entity (202). In some embodiments of the method, determining comprises determining at the service consumer entity (201) a healthy status of the service producer entity (202) in response to the reception of a correct response at the service consumer entity (201) from the service producer entity (202). In some embodiments of the method, the health status can be one of an execution status or a connectivity status.

The method further comprises receiving (201, 601) at the service consumer entity (201) from the service discovery entity (203) a request to check the health status of the service producer entity (202). In some embodiments of the method, the receiving step comprises receiving at the service consumer entity (201) from the service discovery entity (203) a request to a service exposed by the service consumer entity (201) to provide the health status of a service producer entity (202).

This disclosure also provides mobile network nodes, particularly a service producer entity 800, a service consumer entity 1000 and a service discovery entity 900, each configured to perform their respective methods as described in this disclosure. This disclosure also provides the corresponding computer program and computer program products comprising code, for example in the form of a computer program, that when run on processing circuitry of the mobile network nodes causes the mobile network nodes to perform the disclosed methods.

In some embodiments, the health status may be an execution status. For example, an execution status may be one of a status in which the entity is correctly running, or a status in which the entity is not running due to a software crash. In some other embodiments, the health status may be a connectivity status. For example, a connectivity status may be one of a status in which the entity is properly communicating with the entities interacting with it, or a status in which some entities cannot reach the said entity because network problems prevent doing so. In some embodiments, these different health statuses can be reflected in the service discovery entity as different statuses, or they can be aggregated into existing statuses handled by the service discovery entity.

In some embodiments, a healthy producer NF may experience connectivity issues from/to NRF, so NRF puts the producer NF in SUSPENDED state. In this case, if a consumer NF detects that the producer NF is indeed healthy, it can communicate so to NRF and the producer NF state in NRF can be updated to REGISTERED, instead of SUSPENDED, to ensure traffic can be processed normally by the consumer NF and other consumer NFs. A possible action that can be triggered upon this scenario, is that the producer NF can register to an alternative NRF with which no connectivity problems take place.

In some embodiments, a producer NF may perform correctly the health-check mechanisms towards NRF, so NRF puts it in REGISTERED state. However, the producer NF may present connectivity problems towards a consumer NF. In this case the consumer NF can detect the connectivity issue to the producer NF and communicate it to the NRF. Then, NRF can update the producer NF status to SUSPENDED. As this scenario may be an indication of a general connectivity issues by the producer NF that may affect other consumer NFs, the NRF may change the producer NF status to LOCAL CONNECTIVITY ISSUE and notify the subscribed consumer NFs accordingly. Then, consumer NFs can avoid sending traffic towards the producer NF and use other producer NFs in REGISTERED state.

In some embodiments, when a consumer NF is notified or discovers a producer NF is in SUSPENDED state, the consumer NF may check whether this state corresponds to a connectivity issue between NRF and the producer NF, or on the contrary the producer NF is in fact under failure.

In some embodiments, a producer NF implements a health-check service including a health-check request/response operation. This operation may be a NULL operation, that is, the health-check service in the producer NF does not perform any action but echoing the health-check request. In some embodiments, if a consumer NF receives a response from this health-check service, the consumer NF can consider the producer NF is in a healthy status and can keep sending traffic to it.

In some embodiments, NFs are extended with a Service Based Architecture (SBA) service exposing a Service Based Interface (SBI) supporting the health-check request/response operation. For example, for Nudm_SDM service in UDM 112, a new operation can be defined as Nudm_SDM_HealthCheck request/response. Following the 3GPP specifications, the health-check service in UDM 112 can be defined as follows:

Service Operation name: Nudm_SDM_HealthCheck

Description: The service performs health-check operations. If a healthy status is determined, it sends a successful response back, that the consumer should interpret at the Nudm_SDM service is up and running and able to process any service request.

Inputs Required: none

Outputs Required: none.

In some embodiments, a producer NF may not support said health-check service. In this case the producer NF could be tested from a consumer NF by means of an erroneous service request, for example including erroneous parameters or any other malformed request, for example including not allowed NULL or empty parameters. The producer NF regards the request as an error and responds with an error code to the consumer NF. Upon the reception of the response, the consumer NF can regard the producer NF as healthy. In this case the consumer NF may also use network-level reachability mechanisms, for example ICMP's PING utility, to determine the health status of the producer NF.

In some embodiments, the consumer NF analyzes the error code or lack of response and determines the health status of the producer NF. The consumer NF may identify whether the error received identifies a potential NF instance failure or an NF service instance failure. Whether a consumer sends and error code, e.g. HTTP 500 Internal Server Error to identify a whole NF failure or just a service failure would be implementation specific, i.e. how the service concept is mapped to the service or NF 3GPP concept may be implementation specific. But in general, the error applies to the sent request, that is destined to a specific service.

In some embodiments, the consumer NF, based on the error identified, may send a notification to the NRF. This notification needs to include at least the NF instance ID of NF producer and/or the NF service instance ID of the NF service producer. Some extra information may be provided with information about the specific error, this could be used by the NRF for logging/alarms.

In some embodiments, in order to double-check the NF/NF service producer status, the NRF may send a health check request to the NF producer.

In some embodiments, if the NF producer has failed, the NRF may get an error code, or the corresponding response is timeout.

In some embodiments, if NRF determines that the producer NF is faulty, the NRF changes the status of the producer NF to a FAILED status and considers that the NF Producer and its services can no longer be discovered by other NFs via the NF Discovery service. SUSPENDED state does not provide enough information to the consumers, since it may be a result of a lack of connectivity between the NRF and the NF producer, then a FAILED state is required to be able to provide a more accurate information to the subscribed consumers.

In some embodiments, NRF notifies each NF Service Consumer that was previously subscribed to receiving notifications of changes of the NF profile of NF producer.

In some embodiments, the NF consumer may do a discovery including the NF instance ID (and/or the NF service instance Id) of a faulty NF producer. So, the faulty NF producer is excluded from the response due to its status is changed to FAILED.

In some embodiments, the NF consumer informs the NRF about a connectivity failure to a producer NF. This notification needs to include at least either the NF instance ID of NF producer and/or the NF service instance ID of the NF service producer. Some extra information may be provided, this could be used by the NRF for logging/alarms. Then the NRF forces the producer NF status to be LOCAL CONNECTIVITY FAILURE, instead of SUSPENDED. Alternatively, instead of defining a new status, a new attribute could be defined in the NF profile to hold same info, e.g. NF connectivity. NRF may send a notification with the new state to all the subscribed consumer NFs. Alternatively, NRF will provide the updated NF profile, including the updated parameter. Subsequently, consumer NFs may select another producer NF.

In some embodiments, a consumer NF detects faulty producer NFs by means of requests timeouts. E.g. a consecutive number of no answered queries for a percentage of TCP connections; or percentage of no answered queries in a given period of time for a percentage of TCP connections.

In some embodiments, a consumer NF detects faulty producer NFs by means of detecting loss of TCP connections. For example, several consecutive unsuccessful reattempts of TCP connections.

In some embodiments, a consumer NF detects faulty producer NFs by means of multiple and steady HTTP 500 internal server error responses. E.g. a configurable number of consecutive HTTP 500 responses.

In some embodiments, a consumer NF detects faulty producer NFs by means of explicit response codes. For example, Lightweight Directory Access Protocol (LDAP) error code 52.

By the solution described herein, it is achieved that when a service producer entity experiences execution or connectivity problems, this is detected by a service consumer entity when trying to communicate with the service producer entity and immediately notified to a service discovery entity. Subsequently, the service discovery entity can take the appropriate measures to mitigate and solve the detected problem, for example notify the health status of the service producer entity to service consumer entities that are subscribed to this information, so that the service consumer entities can have a timely update of the health status of the service producer entity.

The solution disclosed herein also achieves that a mobile network entity, for example a service consumer entity or a service discovery entity, can proactively check the health of a service producer entity and perform the corresponding actions when health issues are detected.

The solution disclosed herein also achieves the possibility to revert false health issues detections, since it allows to check the health of a service producer entity using several service consumer entities, therefore increasing the health check accuracy.

The solution disclosed herein allows the definition of more granular states in a service discovery entity. For example, there may be a service producer entity executing correctly but having connectivity issues with other specific entities. The disclosed solution allows to detect this more granular states and trigger appropriate actions accordingly.

The solution disclosed herein also allows that a failure of a service discovery entity does not impact the operation and usage of a service producer entity, since the consumers of that service producer entity can check its healthy status and continue using the service producer entity.

Hereinafter, drawings showing examples of embodiments of the solution are described in detail.

Figure 2:
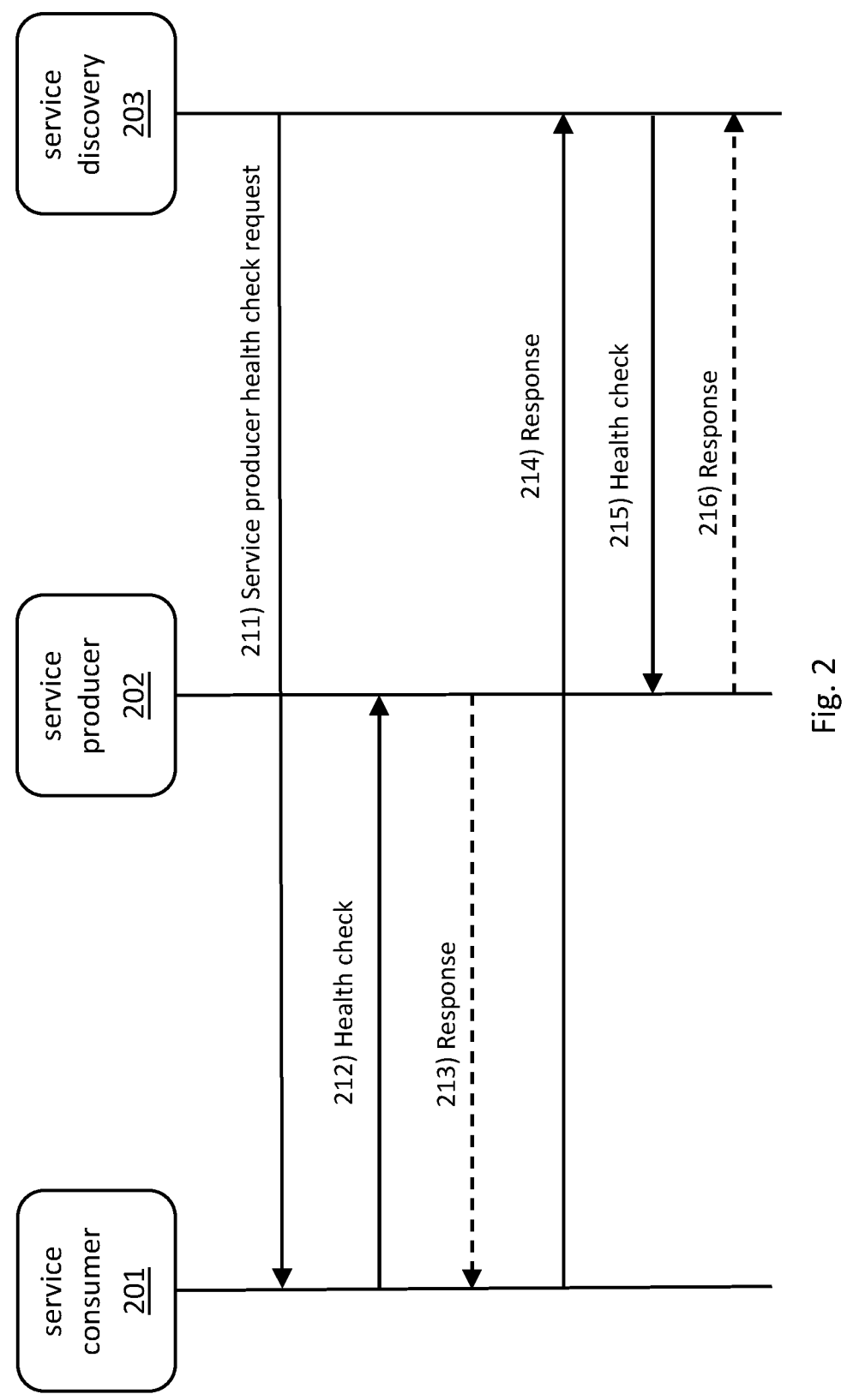
FIG. 2 is a signaling diagram illustrating the procedure of using a secondary notification address for a notification, according to particular embodiments of the solution described herein.

FIG. 2 is a signaling diagram illustrating a procedure for checking the health status of a service producer entity 202 from a service consumer entity 201 and a service discovery entity 203. In some embodiments, the service discovery entity 203 is an NRF 110. In some embodiments, the service consumer entity 201 is a consumer NF. In some embodiments, the service producer entity 202 is a producer NF. In some embodiments, the service consumer entity 201 is a consumer NF service. In some embodiments, the service producer entity 202 is a producer NF service. Examples of consumer NFs and/or producer NFs include, but are not limited to, the control plane nodes represented in FIG. 1, namely AUSF 105, AMF 106, SMF 107, NSSF 108, NEF 109, PCF 111, UDM 112 and AF 113. In some embodiments, an NRF 110 can also act as a consumer NF towards a producer NF.

At step 211, the service discovery entity 203 transmits a service producer health check request to the service consumer entity 201, to gather the health status of the service producer entity 202. The service producer health check request may include an identifier for the service producer entity 202, for example a NF instance identifier, or it may include the address to reach the service producer entity 202.

Step 211 may be triggered when the service discovery entity 203 stops receiving the heartbeat from the service producer entity 202 in order to check that the service producer entity 202 is indeed in unhealthy status, and the heartbeat is not being received for example because of connectivity issues between the service producer entity 202 and the service discovery entity 203.

Step 211 may be also triggered by the service discovery entity 203 as part of a periodic health-check process of the service producer entity 202.

At step 212, the service consumer entity 201 transmits to the service producer entity 202 a health-check request to determine the health status of the service producer entity 202. In some embodiments the health-check request is a request toward a health-check service including a health-check request/response operation. In some embodiments the health-check request is a request toward a Service Based Architecture (SBA) service exposing a Service Based Interface (SBI) supporting the health-check request/response operation. In some embodiments the health-check request is a malformed request or a request including not allowed NULL or empty parameters. In some embodiments the health-check request is performed by means of a network-level reachability mechanism, for example ICMP's PING utility.

At step 213, in some embodiments, the service producer entity 202 transmits to the service consumer entity 201 a response message. In some embodiments, the response is a response of a health-check service including a health-check request/response operation. In some embodiments, the response is a response of a Service Based Architecture (SBA) service exposing a Service Based Interface (SBI) supporting the health-check request/response operation. In some embodiments, the response is a response of a network-level reachability mechanism, for example ICMP's PING utility. In some embodiments, the response includes an indication of the health status. In some embodiments, the response includes an error code, for example a Hypertext Transfer Protocol (HTTP) 500 Internal Server Error. In some other embodiments, the service producer entity 202 transmits no response.

Subsequently to step 213, the service consumer entity 201 may determine the health status of the service producer entity 202 based on the result of the step 213. For example, a healthy status can be determined if a correct response is received in step 213, or an unhealthy status can be determined if an error code is received or no response is received in step 213.

At step 214, the service consumer entity 201 transmits to the service discovery entity 203 the response to the service producer health check request. In some embodiments, the response includes a health status. In some embodiments, the response includes the information received in step 213.

At step 215, the service discovery entity 203 transmits to the service producer entity 202 a health-check request to determine the health status of the service producer entity 202. In some embodiments the health-check request is a request toward a health-check service including a health-check request/response operation. In some embodiments the health-check request is a request toward a Service Based Architecture (SBA) service exposing a Service Based Interface (SBI) supporting the health-check request/response operation. In some embodiments the health-check request is a malformed request or a request including not allowed NULL or empty parameters. In some embodiments the health-check request is performed by means of a network-level reachability mechanism, for example ICMP's PING utility.

At step 216, in some embodiments, the service producer entity 202 transmits to the service discovery entity 203 a response message. In some embodiments, the response is a response of a health-check service including a health-check request/response operation. In some embodiments, the response is a response of a Service Based Architecture (SBA) service exposing a Service Based Interface (SBI) supporting the health-check request/response operation. In some embodiments, the response is a response of a network-level reachability mechanism, for example ICMP's PING utility. In some embodiments, the response includes an indication of the health status. In some embodiments, the response includes an error code, for example a Hypertext Transfer Protocol (HTTP) 500 Internal Server Error. In some other embodiments, the service producer entity 202 transmits no response.

In some embodiments, steps 215 and 216 take place before step 211.

In some embodiments, the service discovery entity 203 may take into consideration the information transmitted in steps 214 and 216 to determine the health status of the service producer entity 202.

Figure 3:
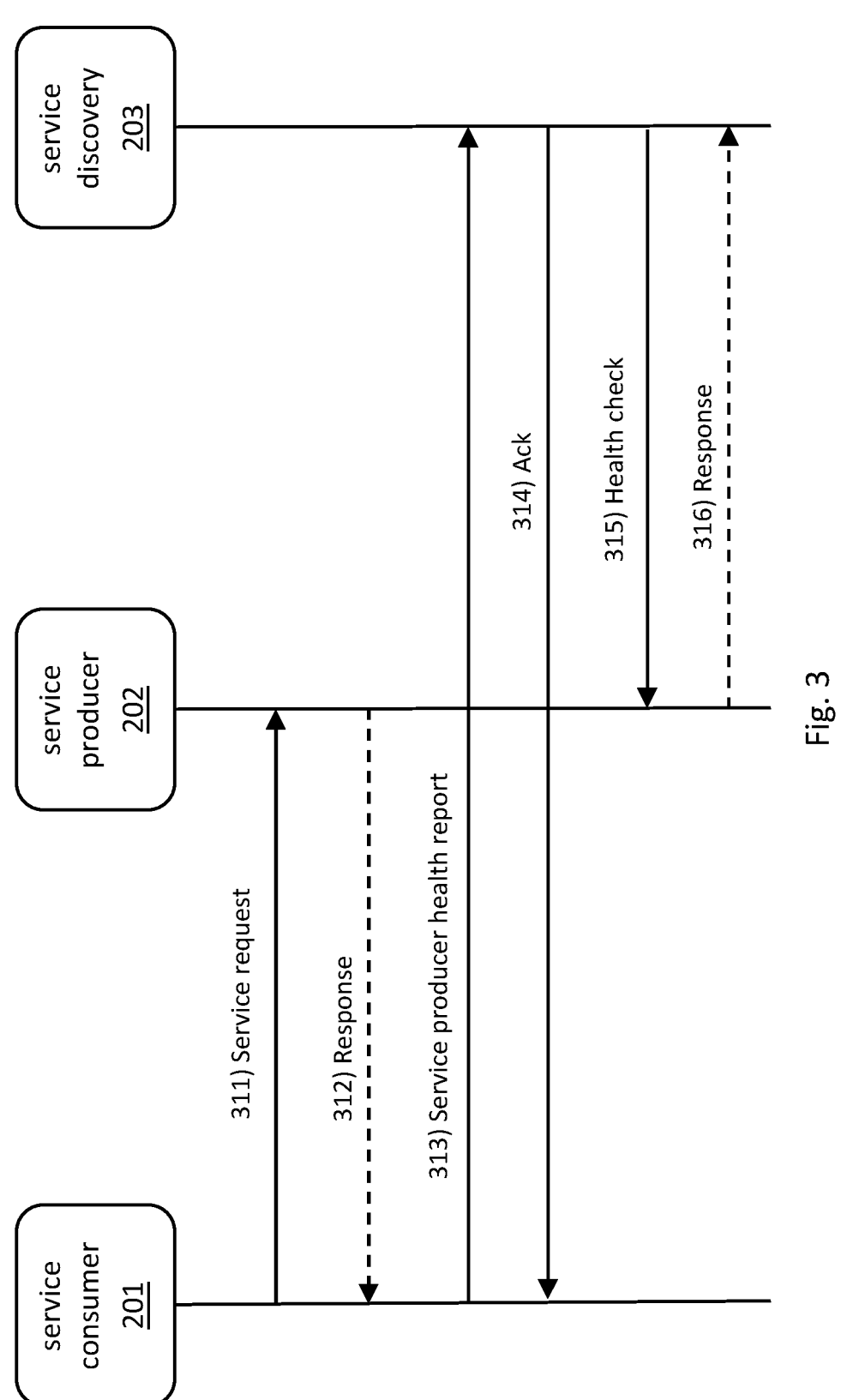
FIG. 3 is a further signaling diagram illustrating the procedure of using a secondary notification address for a notification, according to particular embodiments of the solution described herein.

FIG. 3 is a further signaling diagram illustrating a procedure for checking the health status of a service producer entity 202 from a service consumer entity 201 and a service discovery entity 203. In some embodiments, the service discovery entity 203 is an NRF 110. In some embodiments, the service consumer entity 201 is a consumer NF. In some embodiments, the service producer entity 202 is a producer NF. In some embodiments, the service consumer entity 201 is a consumer NF service. In some embodiments, the service producer entity 202 is a producer NF service. Examples of consumer NFs and/or producer NFs include, but are not limited to, the control plane nodes represented in FIG. 1, namely AUSF 105, AMF 106, SMF 107, NSSF 108, NEF 109, PCF 111, UDM 112 and AF 113. In some embodiments, an NRF 110 can also act as a consumer NF towards a producer NF.

At step 311, the service consumer entity 201 transmits to the service producer entity 202 a service request. In some embodiments, the service request is a health-check request to determine the health status of the service producer entity 202. In some embodiments the health-check request is a request toward a health-check service including a health-check request/response operation. In some embodiments the health-check request is a request toward a Service Based Architecture (SBA) service exposing a Service Based Interface (SBI) supporting the health-check request/response operation. In some embodiments the health-check request is a malformed request or a request including not allowed NULL or empty parameters. In some embodiments the health-check request is performed by means of a network-level reachability mechanism, for example ICMP's PING utility.

At step 312, in some embodiments, the service producer entity 202 transmits to the service consumer entity 201 a response corresponding to the service request in step 311. In some embodiments, the response is a response of a health-check service including a health-check request/response operation. In some embodiments, the response is a response of a Service Based Architecture (SBA) service exposing a Service Based Interface (SBI) supporting the health-check request/response operation. In some embodiments, the response is a response of a network-level reachability mechanism, for example ICMP's PING utility. In some embodiments, the response includes an indication of the health status. In some embodiments, the response includes an error code, for example a Hypertext Transfer Protocol (HTTP) 500 Internal Server Error. In some other embodiments, the service producer entity 202 transmits no response.

Subsequently to step 312, the service consumer entity 201 may determine the health status of the service producer entity 202 based on the result of the step 312. For example, a healthy status can be determined if a correct response is received in step 312, or an unhealthy status can be determined if an error code is received or no response is received in step 312.

At step 313, the service consumer entity 201 transmits to the service discovery entity 203 a health check request report for the service producer entity 202. In some embodiments, the report includes a health status. In some embodiments, the report includes the information received in step 312.

At step 314, the service discovery entity 203 acknowledges to the service consumer entity 201 the health check request report.

At step 315, the service discovery entity 203 transmits to the service producer entity 202 a health-check request to determine the health status of the service producer entity 202. In some embodiments the health-check request is a request toward a health-check service including a health-check request/response operation. In some embodiments the health-check request is a request toward a Service Based Architecture (SBA) service exposing a Service Based Interface (SBI) supporting the health-check request/response operation. In some embodiments the health-check request is a malformed request or a request including not allowed NULL or empty parameters. In some embodiments the health-check request is performed by means of a network-level reachability mechanism, for example ICMP's PING utility.

At step 316, in some embodiments, the service producer entity 202 transmits to the service discovery entity 203 a response message. In some embodiments, the response is a response of a health-check service including a health-check request/response operation. In some embodiments, the response is a response of a Service Based Architecture (SBA) service exposing a Service Based Interface (SBI) supporting the health-check request/response operation. In some embodiments, the response is a response of a network-level reachability mechanism, for example ICMP's PING utility. In some embodiments, the response includes an indication of the health status. In some embodiments, the response includes an error code, for example a Hypertext Transfer Protocol (HTTP) 500 Internal Server Error. In some other embodiments, the service producer entity 202 transmits no response.

In some embodiments, steps 315 and 316 take place before step 311.

In some embodiments, the service discovery entity 203 may take into consideration the information transmitted in steps 313 and 316 to determine the health status of the service producer entity 202.

FIG. 4 is a flowchart illustrating a method performed by a service consumer entity 201 for checking the health status of a service producer entity 202. In some embodiments, the service consumer entity 201 is a consumer NF. In some embodiments, the service producer entity 202 is a producer NF. In some embodiments, the service consumer entity 201 is a consumer NF service. In some embodiments, the service producer entity 202 is a producer NF service. Examples of consumer NFs and/or producer NFs include, but are not limited to, the control plane nodes represented in FIG. 1, namely AUSF 105, AMF 106, SMF 107, NSSF 108, NEF 109, PCF 111, UDM 112 and AF 113.

At step 401, the service consumer entity 201 receives from a service discovery entity 203 a request to check the health status of the service producer entity 202. In some embodiments, the service discovery entity 203 is an NRF 110. The service producer health check request may include an identifier for the service producer entity 202, for example a NF instance identifier, or it may include the address to reach the service producer entity 202.

At step 402, the service consumer entity 201 transmits a request to a service operation exposed by the service producer entity 202. In some embodiments, the service operation is a health-check request to determine the health status of the service producer entity 202. In some embodiments the health-check operation is a request toward a health-check service including a health-check request/response operation. In some embodiments the health-check operation is a request toward a Service Based Interface (SBI) supporting the health-check request/response operation. In some embodiments the health-check operation is a malformed request or a request including not allowed NULL or empty parameters. In some embodiments the health-check request is performed by means of a network-level reachability mechanism, for example ICMP's PING utility.

At step 403, the service consumer entity 201 determines the health status of the service producer entity 202 based on the result of the service operation invocation. For example, a healthy status can be determined if a correct response is received in step 403, or an unhealthy status can be determined if an error code is received or no response is received in step 403.

At step 404, the service consumer entity 201 transmits to the service discovery entity 203 the health status of the service producer entity. In some embodiments, the response includes a health status. In some embodiments, the response includes the information received in step 402.

Figure 5:
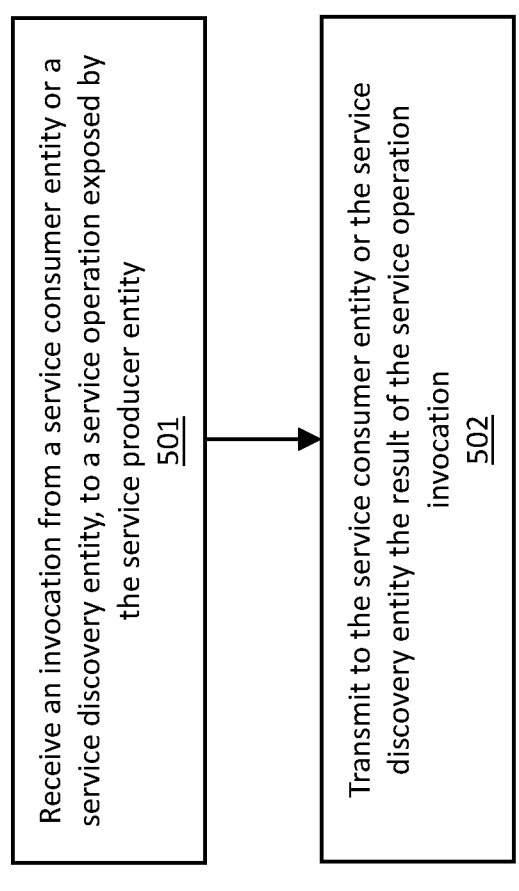
FIG. 5 is a flowchart illustrating a method performed by a service consumer entity for providing a secondary notification address for a notification subscription with a service producer entity, according to particular embodiments of the solution described herein.

FIG. 5 is a flowchart illustrating a method performed by a service producer entity 202 for checking its health status from a service consumer entity 201 or a service discovery entity 203. In some embodiments, the service consumer entity 201 is a consumer NF. In some embodiments, the service producer entity 202 is a producer NF. In some embodiments, the service consumer entity 201 is a consumer NF service. In some embodiments, the service producer entity 202 is a producer NF service. Examples of consumer NFs and/or producer NFs include, but are not limited to, the control plane nodes represented in FIG. 1, namely AUSF 105, AMF 106, SMF 107, NSSF 108, NEF 109, PCF 111, UDM 112 and AF 113. In some embodiments, the service discovery entity 203 is an NRF 110.

At step 501, the service producer entity 202 receives an invocation from the service consumer entity 201 or the service discovery entity 203 to a service operation exposed by the service producer entity 202. In some embodiments, the service operation is a health-check request to determine the health status of the service producer entity 202. In some embodiments the health-check operation is a request toward a health-check service including a health-check request/response operation. In some embodiments the health-check operation is a request toward a Service Based Architecture (SBA) service exposing a Service Based Interface (SBI) supporting the health-check request/response operation. In some embodiments the health-check operation is a malformed request or a request including not allowed NULL or empty parameters. In some embodiments the health-check request is performed by means of a network-level reachability mechanism, for example ICMP's PING utility.

At step 502, the service producer entity 202 transmits to the service consumer entity 201 or the service discovery entity 203 the result of the service operation invocation. In some embodiments, the service producer entity 202 transmits to the service consumer entity 201 a response corresponding to the service request in step 501. In some embodiments, the response is a response of a health-check service including a health-check request/response operation. In some embodiments, the response is a response of a Service Based Architecture (SBA) service exposing a Service Based Interface (SBI) supporting the health-check request/response operation. In some embodiments, the response is a response of a network-level reachability mechanism, for example ICMP's PING utility. In some embodiments, the response includes an indication of the health status. In some embodiments, the response includes an error code, for example a Hypertext Transfer Protocol (HTTP) 500 Internal Server Error. In some other embodiments, the service producer entity 202 transmits no response.

Figure 6:
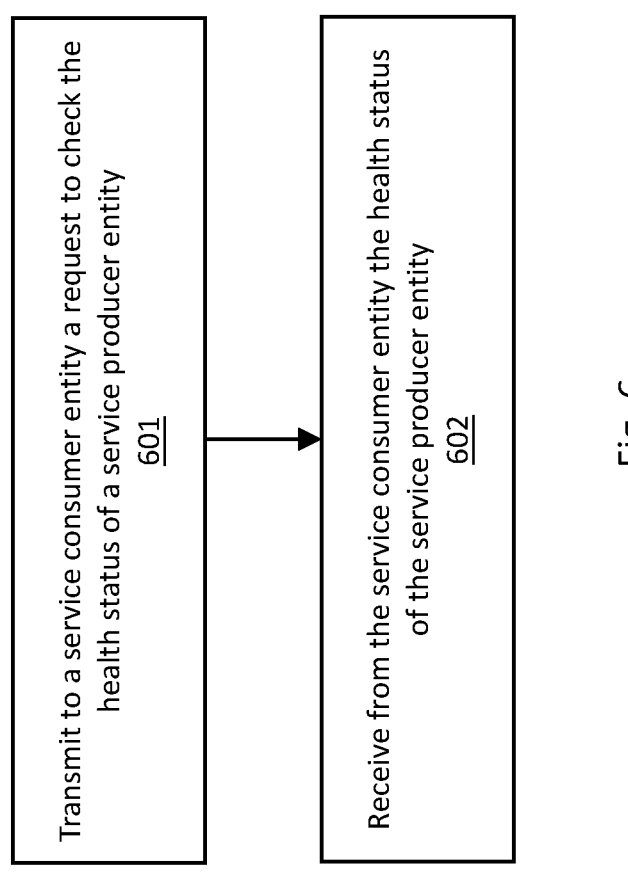
FIG. 6 is a flowchart illustrating a method performed by a service discovery entity for providing a secondary notification address for a notification subscription with a service producer entity, according to particular embodiments of the solution described herein.

FIG. 6 is a flowchart illustrating a method performed by a service discovery entity 203 for checking the health status of a service producer entity 202 using a service consumer entity 201. In some embodiments, the service consumer entity 201 is a consumer NF. In some embodiments, the service producer entity 202 is a producer NF. In some embodiments, the service consumer entity 201 is a consumer NF service. In some embodiments, the service producer entity 202 is a producer NF service. Examples of consumer NFs and/or producer NFs include, but are not limited to, the control plane nodes represented in FIG. 1, namely AUSF 105, AMF 106, SMF 107, NSSF 108, NEF 109, PCF 111, UDM 112 and AF 113. In some embodiments, the service discovery entity 203 is an NRF 110.

At step 601, the service discovery entity 203 transmits to a service consumer entity 201 a request to check the health status of the service producer entity 202. The service producer health check request may include an identifier for the service producer entity 202, for example a NF instance identifier, or it may include the address to reach the service producer entity 202.

At step 602, the service discovery entity 203 receives from the service consumer entity 201 the health status of the service producer entity 202. In some embodiments, the service discovery entity 203 receives an indication of the health status. In some embodiments, the service discovery entity 203 receives an error code, for example a Hypertext Transfer Protocol (HTTP) 500 Internal Server Error. In some other embodiments, the service discovery entity 203 receives no response.

Figure 7:
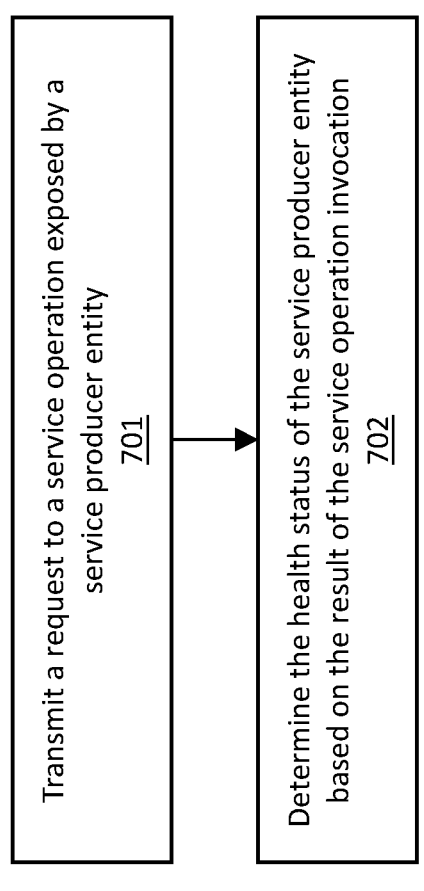
FIG. 7 is a flowchart illustrating a method performed by a service discovery entity for providing a secondary notification address for a notification subscription with a service producer entity, according to particular embodiments of the solution described herein.

FIG. 7 is a flowchart illustrating a method performed by a service discovery entity 203 for checking the health status of a service producer entity 202. In some embodiments, the service producer entity 202 is a producer NF. In some embodiments, the service producer entity 202 is a producer NF service. Examples of producer NFs include, but are not limited to, the control plane nodes represented in FIG. 1, namely AUSF 105, AMF 106, SMF 107, NSSF 108, NEF 109, PCF 111, UDM 112 and AF 113. In some embodiments, the service discovery entity 203 is an NRF 110.

At step 701, the service discovery entity 203 transmits a request to a service operation exposed by the service producer entity 202. In some embodiments, the service operation is a health-check request to determine the health status of the service producer entity 202. In some embodiments the health-check operation is a request toward a health-check service including a health-check request/response operation. In some embodiments the health-check operation is a request toward a Service Based Architecture (SBA) service exposing a Service Based Interface (SBI) supporting the health-check request/response operation. In some embodiments the health-check operation is a malformed request or a request including not allowed NULL or empty parameters. In some embodiments the health-check request is performed by means of a network-level reachability mechanism, for example ICMP's PING utility.

At step 702, the service discovery entity 203 determines the health status of the service producer entity based on the result of the service operation invocation. For example, a healthy status can be determined if a correct response is received in step 701, or an unhealthy status can be determined if an error code is received or no response is received in step 701.

Figure 8:
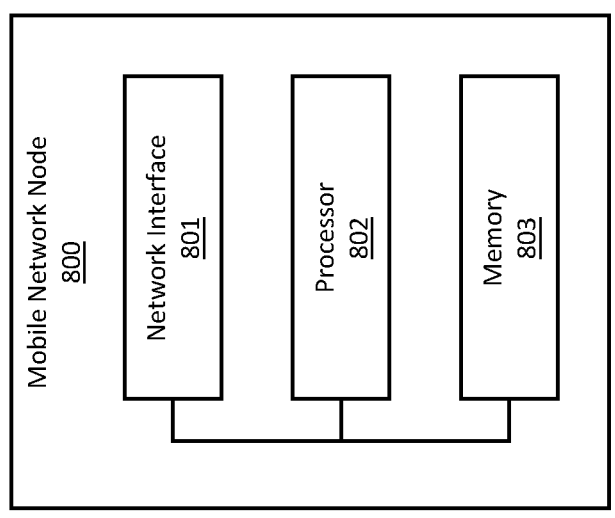
FIG. 8 is a block diagram of a mobile network node configured in accordance with some embodiments of the solution described herein.

FIG. 8 is a block diagram illustrating elements of a mobile network node 800 of a communication network configured to provide cellular communication according to some embodiments. As shown, the mobile network node may include network interface circuitry 801 (also referred to as a network interface) configured to provide communications with other nodes of the core network and/or the network.

The mobile network node may also include a processing circuitry 802 (also referred to as a processor) coupled to the network interface circuitry, and memory circuitry 903 (also referred to as memory) coupled to the processing circuitry. The memory circuitry 803 may include computer readable program code that when executed by the processing circuitry 802 causes the processing circuitry to perform operations according to embodiments disclosed herein. According to other embodiments, processing circuitry 802 may be defined to include memory so that a separate memory circuitry is not required.

As discussed herein, operations of the mobile network node may be performed by processing circuitry 802 and/or network interface circuitry 801. For example, processing circuitry 902 may control network interface circuitry 801 to transmit communications through network interface circuitry 801 to one or more other network nodes and/or to receive communications through network interface circuitry from one or more other network nodes. Moreover, modules may be stored in memory 803, and these modules may provide instructions so that when instructions of a module are executed by processing circuitry 802, processing circuitry 802 performs respective operations (e.g., operations discussed below with respect to Example Embodiments relating to core network nodes).

In some embodiments, the mobile network node 800 is a service producer entity 202. In some embodiments, the mobile network node 800 is a producer NF, for example, but not limited to, AUSF 105, AMF 106, SMF 107, NSSF 108, NEF 109, PCF 111, UDM 112 and AF 113. In some embodiments, the service producer entity 202 is a NF service exposed by the mobile network node 800.

Figure 9:
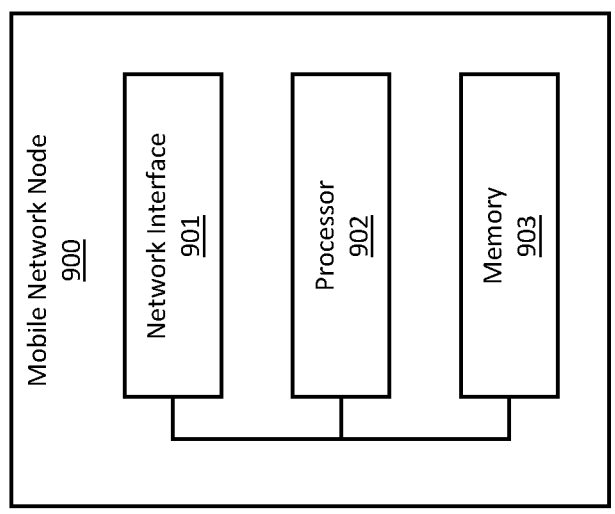
FIG. 9 is a block diagram of a mobile network node configured in accordance with some embodiments of the solution described herein.

FIG. 9 is a block diagram illustrating elements of a mobile network node 900 of a communication network configured to provide cellular communication according to some embodiments. As shown, the mobile network node may include network interface circuitry 901 (also referred to as a network interface) configured to provide communications with other nodes of the core network and/or the network. The mobile network node may also include a processing circuitry 902 (also referred to as a processor) coupled to the network interface circuitry, and memory circuitry 903 (also referred to as memory) coupled to the processing circuitry. The memory circuitry 903 may include computer readable program code that when executed by the processing circuitry 902 causes the processing circuitry to perform operations according to embodiments disclosed herein. According to other embodiments, processing circuitry 902 may be defined to include memory so that a separate memory circuitry is not required.

As discussed herein, operations of the mobile network node may be performed by processing circuitry 902 and/or network interface circuitry 901. For example, processing circuitry 902 may control network interface circuitry 901 to transmit communications through network interface circuitry 901 to one or more other network nodes and/or to receive communications through network interface circuitry from one or more other network nodes. Moreover, modules may be stored in memory 903, and these modules may provide instructions so that when instructions of a module are executed by processing circuitry 902, processing circuitry 902 performs respective operations (e.g., operations discussed below with respect to Example Embodiments relating to core network nodes).

In some embodiments, the mobile network node 900 is a service consumer entity 201. In some embodiments, the mobile network node 900 is a consumer NF, for example, but not limited to, AUSF 105, AMF 106, SMF 107, NSSF 108, NEF 109, PCF 111, UDM 112 and AF 113. In some embodiments, the service consumer entity 201 is a NF service exposed by the mobile network node 900.

Figure 10:
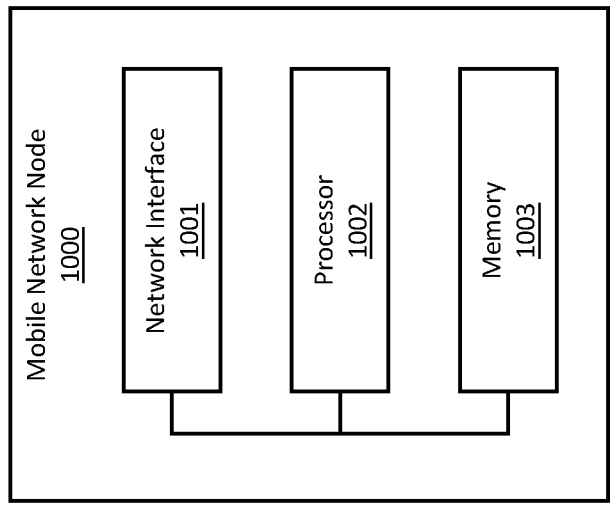
FIG. 10 is a block diagram of a mobile network node configured in accordance with some embodiments of the solution described herein.

FIG. 10 is a block diagram illustrating elements of a mobile network node 1000 of a communication network configured to provide cellular communication according to some embodiments. As shown, the mobile network node may include network interface circuitry 1001 (also referred to as a network interface) configured to provide communications with other nodes of the core network and/or the network. The mobile network node may also include a processing circuitry 1002 (also referred to as a processor) coupled to the network interface circuitry, and memory circuitry 1003 (also referred to as memory) coupled to the processing circuitry. The memory circuitry 1003 may include computer readable program code that when executed by the processing circuitry 1002 causes the processing circuitry to perform operations according to embodiments disclosed herein. According to other embodiments, processing circuitry 1002 may be defined to include memory so that a separate memory circuitry is not required.

As discussed herein, operations of the mobile network node may be performed by processing circuitry 1002 and/or network interface circuitry 1001. For example, processing circuitry 1002 may control network interface circuitry 1001 to transmit communications through network interface circuitry 1001 to one or more other network nodes and/or to receive communications through network interface circuitry from one or more other network nodes. Moreover, modules may be stored in memory 1003, and these modules may provide instructions so that when instructions of a module are executed by processing circuitry 1002, processing circuitry 1002 performs respective operations (e.g., operations discussed below with respect to Example Embodiments relating to core network nodes).

In some embodiments, the mobile network node 1000 is a service discovery entity 203. In some embodiments, the mobile network node 1000 is an NRF 110.

The invention claimed is:

1. A service consumer entity to check health status of a service producer entity, the service consumer entity configured to:
   determine the health status of the service producer entity; and
   transmit, to a service discovery entity, the health status of the service producer entity, wherein in an event the service consumer entity is notified or discovers that the service producer entity is in SUSPENDED state, the service consumer entity checks whether this state corresponds to a connectivity issue between a service discovery entity and the service producer entity.

2. The service consumer entity of claim 1, wherein the determine step comprises transmit a request message to the service producer entity, particularly transmit a subscription request message to the service producer entity.

3. The service consumer entity of claim 2, wherein the request message is a request toward a health-check service exposed by the service producer entity.

4. The service consumer entity of claim 1, wherein the determine step comprises performing network-level reachability test mechanisms to the service producer entity.

5. The service consumer entity of claim 1, wherein the determine step comprises determine an unhealthy status of the service producer entity in response to reception of an error indication, or reception of no response, from the service producer entity.

6. The service consumer entity of claim 1, wherein the determine step comprises determine a healthy status of the service producer entity in response to reception of a correct response from the service producer entity.

7. The service consumer entity of claim 1, wherein the health status is one of an execution status or a connectivity status.

8. The service consumer entity of claim 1, further configured to:
   receive from the service discovery entity a request to check the health status of the service producer entity.

9. The service consumer entity of claim 8, wherein the receive step comprises receive from the service discovery entity a request to a service exposed by the service consumer entity to provide the health status of the service producer entity.

10. A service producer entity to check its health status, the service producer entity configured to:
   receive from a mobile network entity, a health-check request to a health-check service exposed by the service producer entity; and
   transmit to the mobile network entity an echo of the health-check request as the result of the health-check request, wherein the service producer entity is configured to implement a health-check service including a health-check request/response operation that echoes the health-check request.

11. The service producer entity of claim 10, wherein the transmit step comprises transmitting an error indication, or transmit no response.

12. The service producer entity of claim 10, wherein the transmit step comprises transmit an indication of a healthy status.

13. A service discovery entity to check health status of a service producer entity, the service discovery entity configured to:
   transmit, to a service consumer entity, a request to check the health status of the service producer entity; and
   receive, from the service consumer entity, the health status of the service producer entity, wherein in an event the service discovery entity determines that the service producer entity is faulty, the service discovery entity changes the status of the service producer entity to a FAILED status and considers that the service producer entity and its services is no longer be discovered by other service discovery entity.

14. The service discovery entity of claim 13, wherein the transmit step comprises transmit a request to a service exposed by the service consumer entity to provide the health status of the service producer entity.

15. A service discovery entity to check health status of a service producer entity, the service discovery entity configured to:
   transmit a request to a service exposed by the service producer entity; and
   determine the health status of the service producer entity based on the result of the request wherein in an event the service discovery entity determines that the service producer entity is faulty, the service discovery entity changes the status of the service producer entity to a FAILED status and considers that the service producer entity and its services is no longer be discovered by other service discovery entity.

16. The service discovery entity of claim 15, wherein the service is a health-check service exposed by the service producer entity.

19

20

17. The service discovery entity of claim 15, wherein the transmit step comprises perform network-level reachability test mechanisms toward the service producer entity.

18. The service discovery entity of claim 15, wherein the determine step comprises determine an unhealthy status of the service producer entity in response to reception of an error indication, or reception of no response, from the service producer entity.

19. The service discovery entity of claim 15, wherein the determine step comprises determine a healthy status of the service producer entity in response to reception of a correct response from the service producer entity.

20. The service discovery entity of claim 15, wherein the health status is one of an execution status or a connectivity status.

\* \* \* \* \*